(12) United States Patent
Goss et al.

(10) Patent No.: US 8,397,101 B2
(45) Date of Patent: Mar. 12, 2013

(54) ENSURING A MOST RECENT VERSION OF DATA IS RECOVERED FROM A MEMORY

(75) Inventors: Ryan James Goss, Lakeville, MN (US); Mark Allen Gaertner, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 295 days.

(21) Appl. No.: 12/793,096

(22) Filed: Jun. 3, 2010

(65) Prior Publication Data

US 2011/0302474 A1 Dec. 8, 2011

(51) Int. Cl.
*G06F 11/08* (2006.01)
*G06F 11/00* (2006.01)

(52) U.S. Cl. ......... 714/6.1; 714/6.24; 714/42; 711/209

(58) Field of Classification Search .................. 714/6.1, 714/6.11, 6.12, 6.2, 6.23, 6.24, 6.3, 15, 20, 714/42; 711/103, 154, 156, 209
See application file for complete search history.

(56) References Cited

U.S. PATENT DOCUMENTS

| | | | |
|---|---|---|---|
| 5,640,608 A | 6/1997 | Dockter et al. | |
| 5,896,393 A | 4/1999 | Yard et al. | |
| 6,282,700 B1 | 8/2001 | Grover et al. | |
| 6,553,511 B1 * | 4/2003 | DeKoning et al. | 714/6.12 |
| 6,725,329 B1 | 4/2004 | Ng et al. | |
| 7,360,039 B2 | 4/2008 | DeJong et al. | |
| 2003/0078930 A1 | 4/2003 | Surcouf et al. | |
| 2005/0198079 A1 | 9/2005 | Heeb | |
| 2005/0198088 A1 | 9/2005 | Subramoney et al. | |
| 2006/0161737 A1 | 7/2006 | Martin et al. | |
| 2006/0248130 A1 | 11/2006 | Grarup et al. | |
| 2006/0271725 A1 * | 11/2006 | Wong | 711/103 |
| 2008/0229139 A1 | 9/2008 | Moir et al. | |
| 2009/0276586 A1 * | 11/2009 | Royer et al. | 711/154 |
| 2009/0313453 A1 * | 12/2009 | Stefanus et al. | 714/6 |

* cited by examiner

*Primary Examiner* — Joseph D Manoskey
(74) *Attorney, Agent, or Firm* — Hall Estill Attorneys at Law

(57) ABSTRACT

Method and apparatus for ensuring a most recent version of data is retrieved from a memory, such as a non-volatile flash memory array. In accordance with various embodiments, a controller is adapted to sequentially store different versions of an addressable data block having a selected logical address in different locations within a memory. The controller assigns a revision indication value to each said version, with at least two of said stored versions concurrently sharing the same revision indication value. In some embodiments, the revision indication value constitutes a repeating cyclical sequence count that is appended to each block, or logically combined with a code value and stored with each block. The total number of counts in the sequence is less than the total number of versions resident in the memory.

20 Claims, 4 Drawing Sheets

METADATA TABLE FORMAT

SECTOR (LBA) FORMATS

ENSURING A MOST RECENT VERSION OF DATA IS RECOVERED FROM A MEMORY

SUMMARY

Various embodiments of the present invention are generally directed to a method and apparatus for ensuring that a most recent version of data is recovered from a memory.

In accordance with various embodiments, a controller is adapted to store different versions of an addressable data block in different locations within a memory, such as a non-volatile data storage array. The controller assigns a revision indication value to each said version, with at least two of said stored versions concurrently sharing the same revision indication value.

These and other features and advantages which characterize the various embodiments of the present invention can be understood in view of the following detailed discussion and the accompanying drawings.

DETAILED DESCRIPTION

Figure 1:
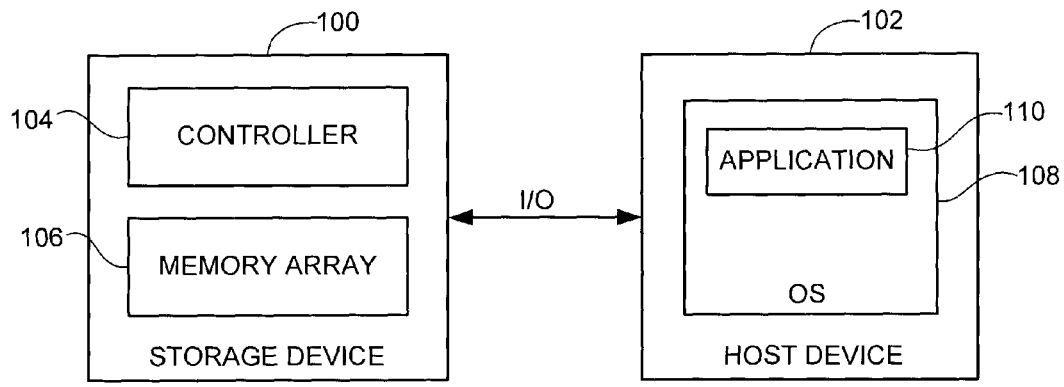
FIG. 1 provides a functional block representation of a data storage device adapted to provide a main memory for a host device in accordance with various embodiments of the present invention.

The present disclosure relates to data handling systems, and in particular to methods and devices that track different versions of data in a memory.

Data storage devices generally operate to store addressable blocks (sectors) of data in memory. The devices can employ data management systems to track the physical locations of the blocks so that the blocks can be subsequently retrieved responsive to a read request for the stored data. Some types of data storage devices, such as solid state drives (SSDs), are configured to write data to a new available location each time a block is presented for writing. Over time, a situation may arise where several versions of a given block may persist in memory, with one of the versions being the most current data and the remaining versions being older, stale data.

Metadata can be generated and maintained to track the locations and status of the stored data. The metadata track the relationship between logical elements (such as logical block addresses, LBAs) stored in the memory space and physical locations (such as physical block addresses, PBAs) of the memory space.

Data management systems often expend considerable effort in maintaining the metadata in an up-to-date and accurate condition, since the metadata are used to retrieve data responsive to host data requests. Metadata failures can occur from time to time due to a variety of factors, including loss or corruption of the stored metadata, failures in the circuitry used to access the metadata, incomplete updates of the metadata during a power failure, etc. In some cases, a metadata failure may result in an older version of data being returned to the host. In other cases, the failure may render the entire device unusable.

In accordance with exemplary embodiments, the integrity of a memory can be improved by storing and maintaining revision indication values as part of a metadata system for the memory. As explained below, the revision indication values constitute a cyclical repeating sequence number count that is incremented as each succession version of a given sector of data is stored to the memory. Multiple versions of the same sector can share the same sequence number, although immediately successive versions will have different sequence numbers assigned thereto.

In some embodiments, the sequence number is a two-bit value allowing the use of four different sequence numbers (e.g., 00, 01, 10 and 11) to be cyclically assigned to each new revision of data added to the array in turn. When the sequence count has reached its maximum count number, the count rolls over and the next written version is assigned the minimum count number in the sequence.

The assigned revision indication value allows a storage device to easily ascertain during a read operation whether the most current version of a given sector has been properly located by the metadata. If not, the sequence counts enable an efficient search methodology to be implemented to locate the most current version of the data.

These and other aspects of the various disclosed embodiments can be understood beginning with a review of FIG. 1 which shows an exemplary data storage device 100. While not limiting, for purposes of the present discussion the device 100 will be characterized as a solid-state drive (SSD) that utilizes flash memory to provide non-volatile memory storage for a host device 102. The host device can take any number of forms, such as a personal computer (PC) or a portable electronic consumer device.

The storage device 100 includes a controller 104 which provides top-level control and communication functions as the device interacts with the host device 102 to store and retrieve host user data. A memory array 106 provides non-volatile storage of the data in the form of an array of flash memory cells. It will be appreciated that a number of additional circuits may be incorporated into the storage device 100 such as an input/output (I/O) communications circuit, one or more data buffers, a hierarchical cache structure, read/write drivers, local dynamic random access memory (DRAM), on-the-fly ECC generating circuitry, etc.

The controller 104 may be a programmable CPU processor that operates in conjunction with programming stored in a computer memory within the device 100. The controller 104 may alternatively be realized in hardware, or the controller functionality may be physically incorporated into the memory array 106.

While not limiting, the host device 102 is processor based and operates using an operating system (OS) 108. One or more software applications 110 allow a user to create and manage data in the form of data objects (files) which are stored to and retrieved from the memory array 106. The OS 108 may employ a file allocation table (FAT) or other mechanism to manage these objects.

Figure 2:
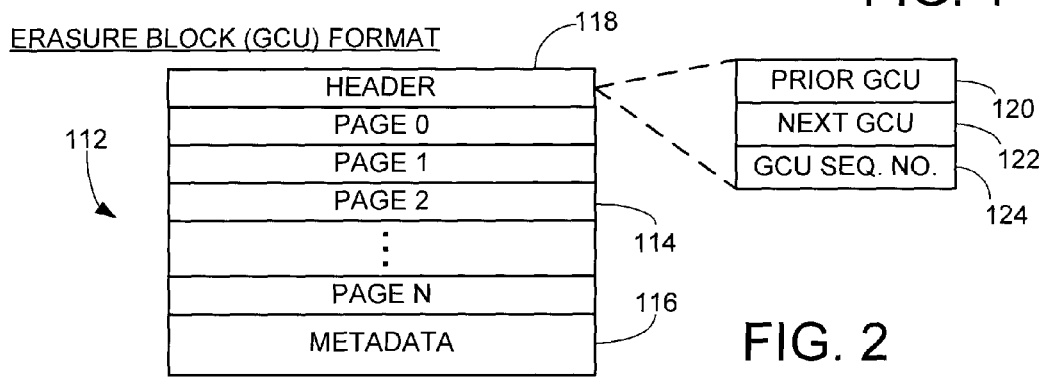
FIG. 2 illustrates an exemplary format for an erasure block (garbage collection unit, or GCU) of the memory array of FIG. 1.

The non-volatile flash memory cells of the memory array 106 are arranged into rows and columns to form a number of erasure blocks 112, as shown in FIG. 2. Each erasure block 112, also referred to herein as a garbage collection unit (GCU), constitutes multiple pages (rows) 114 of the memory cells, with each page sharing a common source control line. An entire page's worth of data are written or read at a time during normal write and read operations. An exemplary GCU size is 256 pages with 8192 bytes of data per page, although other GCU sizes can be used. The erasure block 112 represents the smallest increment of memory subjected to an erase operation at a given time.

In some embodiments, data are supplied from the host device 102 in fixed size blocks (sectors), such as 512 bytes. Each sector may have an associated logical block address (LBA) which allows unique identification of the block at the host level. The blocks of data are stored at an associated physical block address (PBA) in the array. Due to a variety of factors including data compression, encoding, encryption, etc., the actual number of bits stored in the associated PBA in the array may vary from one block to the next.

Metadata are generated and stored to provide the requisite logical-to-physical locality to convert LBA information to the associated PBA information for each sector stored by the array. The metadata may also store other types of control information to enable the controller 102 to manage device operation. The metadata can be stored in a metadata field 116 within the GCU 112 as shown, or may be stored elsewhere in the array such as in one or more GCUs dedicated to this purpose.

The exemplary GCU format of FIG. 2 further shows the use of a GCU header field 118. The header field 118 may or may not occupy a full row (page) of memory cells, and may be located elsewhere in the array. The header field stores header information including a prior GCU field 120, a next GCU field 122 and a GCU sequence number field 124.

During operation, the device will allocate GCUs for use as required, and newly presented data will be added to the available allocated GCUs on a page-by-page basis. In accordance with various embodiments, the controller uses GCU linking information to track allocation order of the various GCUs. A prior GCU value (field 120) identifies the address of the GCU that was allocated immediately prior to the current GCU 112, a next GCU value identifies the address of the GCU that was allocated after the current GCU 112, and a GCU sequence number is a timestamp or other sequence value that provides an indication of when the current GCU was allocated.

Figure 3:
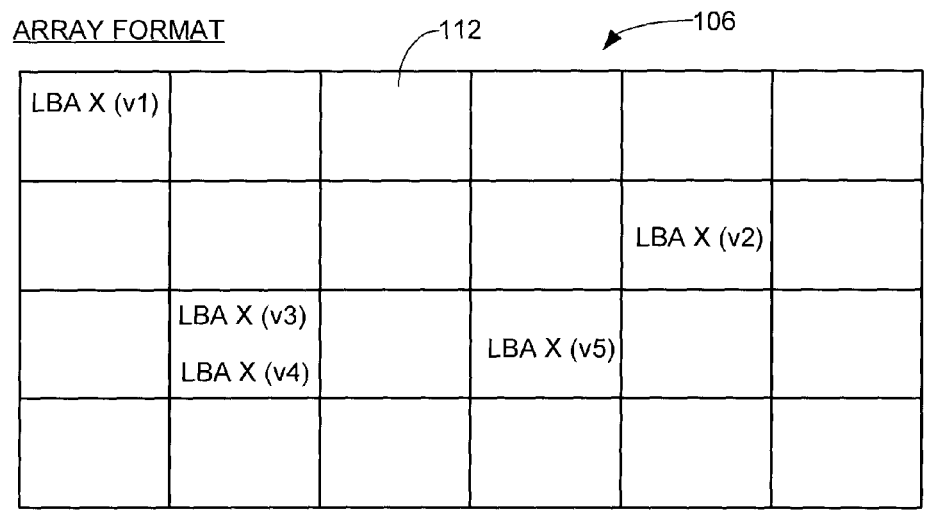
FIG. 3 is a functional representation of the memory array.

FIG. 3 shows the memory array 106 of FIG. 1 to be made up of an array of GCUs 112 as set forth by FIG. 2. The GCUs 112 may be physically adjacent to one another, or may be physically disposed on different layers, stripes, lanes or chips (dies). Each GCU 112 will have its own erasure block address.

Because the exemplary flash memory cells need to be erased before new data can be written thereto, it is common for devices to write updated versions of blocks sharing a common LBA value in different locations within the array. Each time the host 102 provides a write command to write a new successive version of a selected block (LBA), the device 100 writes the data to a new page within the array 106.

The most recently stored version of the LBA represents the "current" data, and all previously stored versions constitute older "stale" data. The metadata utilizes forward pointers to enable the system to locate the current version of the data responsive to a read request for a particular LBA. This is illustrated in FIG. 3 for a selected LBA X, of which five different versions have been stored to the array. Version 5 (v5) represents the current, most recently stored version of the sector data for LBA X, and the metadata will ideally point to this location. The v5 data will be returned to the host responsive to a read request for LBA X. The remaining versions v1-v4 represent older, stale data for LBA X, and will be ignored during a read operation for the sector. It will be appreciated that the different versions of LBA X may store different data sets, with each later occurring versions having been modified as compared to each earlier successive version such as by the application 110 (FIG. 1). This is not necessarily required, though, as different versions of a given LBA in the array may store the same user data.

Garbage collection operations may be periodically carried out by the device 100 to reclaim GCUs 112 that store stale data. Garbage collection operations take place in the background and may be scheduled at appropriate times, such as during idle periods with low host I/O activity. When most or all of the data in a selected GCU 112 are determined to be stale, the garbage collection process will erase the selected block and place the erased block back into an allocation pool of available blocks. Any current data in the block will be copied to a newly allocated block prior to the erasure operation. Multiple GCUs may be grouped together and concurrently subjected to an erasure operation as desired.

The array 106 may be over-provisioned so that the total number of GCUs in the array is greater than that required to meet the rated data storage capacity of the device 100. The additional OP storage space is provided to reduce excessive movement of data within the device 100, as well as to extend the useful life of the device. The amount of additional OP space may be upwards of 100% or more of the rated device data storage capacity.

The device 100 operates to apply wear leveling to the array 106 so that each of the GCUs (erasure blocks) 112 receives roughly the same amount of wear over time. Different ones of the erasure blocks will be allocated for use so that no one erasure block receives a significantly greater number of writes and erasures than other blocks. This wear leveling helps to extend the operational life of the array, and can be implemented by having the controller 102 maintain a history sequence of GCU allocations using the header field 118 (FIG. 2), and selecting new blocks 112 for allocation in an order such that each block generally receives the same amount of utilization.

Figure 4:
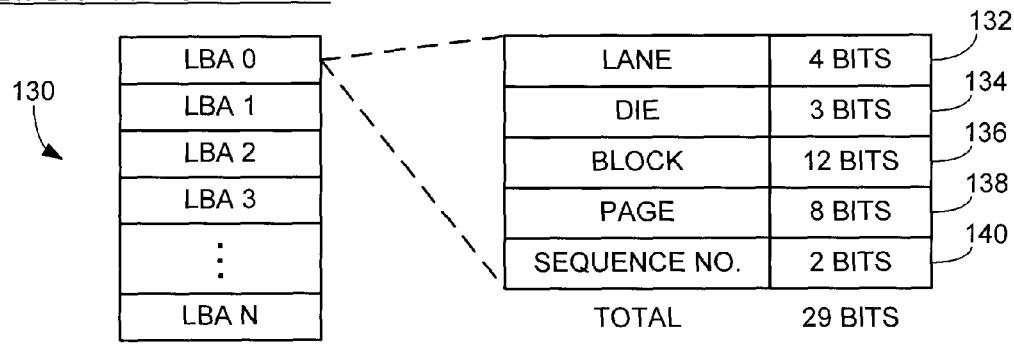
FIG. 4 shows an exemplary format for a metadata table.

A metadata table may be used during device operation as shown at 130 in FIG. 4. The metadata table may be a local volatile or non-volatile computer memory location in which the metadata from the array (or a portion thereof) is loaded, such as during system initialization or at other suitable times. The metadata may be arranged and/or sorted in LBA sequence to enable fast searching and location of the metadata for each associated LBA value. The table 130 may be sized to hold all of the metadata associated with the array, or metadata may be moved in and out of the table depending on system operational needs.

The metadata table entries in FIG. 4 include a lane address (field 132), a die address (field 134), a block (GCU) address (field 136) and a page address (field 138). Other metadata formats and components can be used as desired. During a read operation, the host device 102 issues a read command to the data storage device 100 to retrieve one or more selected LBAs. The controller 104 will consult the metadata table 130 to identify the physical address of the requested data within the array 104. Assuming that the metadata is error free and fully up to date, the physical address (e.g., lane, die, GCU and page) that stores the most current version of the data will be correctly indicated by the metadata. Based on this information, the controller 104 will direct a read operation upon the identified page, process the recovered data therefrom, and return the requested data to the host.

A problem can arise when the array 104 stores multiple versions of a given LBA and the metadata does not correctly point to the most current version of the LBA. With reference again to FIG. 3, the metadata table 130 may identify the latest metadata entry for LBA X to be that corresponding to version 4 (v4), rather than the most current version 5 (v5). In such case, the storage device 100 may improperly return the older v4 data rather than the most current v5 data to the host 102.

To reduce the occurrence of these and other types of metadata errors, the metadata table 130 of FIG. 4 is further shown to include an LBA sequence number field 140. The sequence number field 140 operates to provide a small set of cyclical revision indication values for different versions of the same LBA. In some embodiments, the revision indication values are a two-bit repeating count of sequence numbers 00, 01, 10 and 11 which are incrementally assigned by the controller 104 as each newer version of LBA is stored in the array 106. It will be noted that other sequential count orders can be used, such as 00, 01, 11 and 10 so that only one bit changes as each new sequence number is used. More generally, the revision indication values will extend over a selected total count M (such as M=4) from a minimum value (such as 0) to a maximum value (such as 3). Once the maximum count is reached, the count rolls over and the minimum value is used for the next allocation. It will be appreciated that a preselected random sequence can be provided for the cyclical repetitive count (e.g., the sequence 11, 01, 00, 10 can be used, etc.). Moreover, the sequence count can be more than two bits or less than two bits and not all of the available increments need be used (e.g., five revisions could be represented using three bits although three bits would normally accommodate up to eight revisions, etc.).

Using the above two-bit scheme, the first version (v1) of LBA X in FIG. 3 can be assigned sequence number 0; v2 can be assigned a sequence number of 1; v3 can be assigned the number 2; v4 can be assigned the number 3; and the most current version v5 will also have the number 0 so that both v1 and v5 share the same revision indication value. Depending on the number of versions of a given LBA stored in the array and the number of bits in the sequence number field 140, it is contemplated that any number of different versions of the LBA in the memory array 104 may share the same revision indication value.

The assigned sequence number count can be stored with the sector data in a number of ways. In some embodiments, the two bits can be embedded in a header field for each sector, so that the revision indication value can be read out directly as each sector is read out from the memory array. A straightforward comparison can be made between the indication value bits and the bits in the sequence number field 140 of the metadata to ascertain whether the correct version of data have been read.

Figure 5:
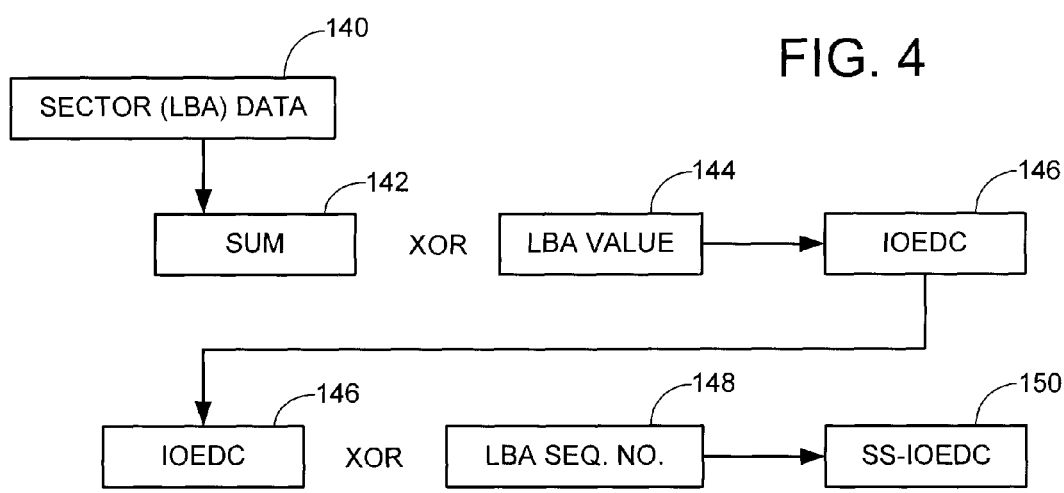
FIG. 5 illustrates a sequence of steps carried out to provide a sequence seeded input/output error detection and correction code (SS-IOEDC) value in accordance with various embodiments.

In other embodiments, the revision sequence number can be easily embedded within other control values generated by the system and then extracted as required. FIG. 5 shows an exemplary process to generate an error detection and correction (EDC) code value that is stored with the sector data. It will be appreciated that the processing of FIG. 5 is merely exemplary and other approaches can be employed.

When sector (LBA) data 140 having a particular LBA value are provided to the storage device 100 for storage by the host 102, the data 140 are temporarily stored in a local cache. The data may constitute a selected number of bytes, such as 512 bytes. A data checksum value 142 can be generated by summing together the individual 8-bit bytes of the input sector data. The checksum 142 is combined using a suitable combinatorial logic function, such as an exclusive-or (XOR), with a multi-bit representation of the LBA value 144. The result from the XOR operation is referred to as an IOEDC value (input/output error detection code). Alternatively, the input data 140 may be directly XORed with the LBA value 144 to generate the IOEDC value. It will be appreciated that other types of code values can be used.

The IOEDC is an LBA seeded checksum that embeds the LBA value with the data to provide a level of error detection and correction for the data. It will be noted that the IOEDC values for each of the five versions of LBA X in FIG. 3 will be different in relation to differences among the associated sector data, but the LBA component in each IOEDC value will be the same. Thus, extracting the LBA seeded value from each of these IOEDC checksums will all produce the same LBA value, which is useful in determining that the correct LBA value has been identified. This does not, however, help to confirm whether the correct version of data has been retrieved.

Accordingly, the processing of FIG. 5 continues by seeding the IOEDC value with the next available two-bit sequence number 148 to provide a sequence seeded checksum SS-IOEDC 150. As before, an XOR function is used to seed the IOEDC, although other logical combinations can be used.

Figure 6:
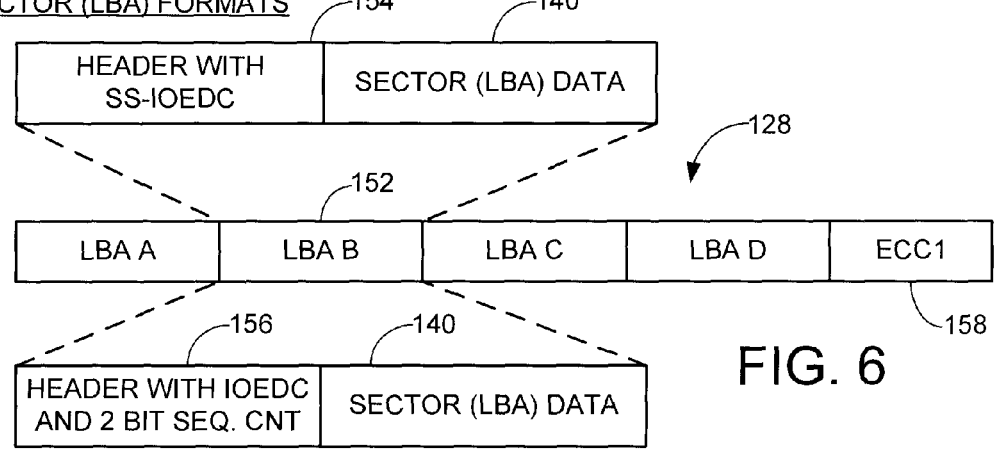
FIG. 6 shows an exemplary format for a sector of data having an SS-IOEDC value from FIG. 5.

FIG. 6 shows different exemplary sector formats for LBAs 152 written to a selected page 128. One exemplary format embeds the SS-IOEDC value 150 from FIG. 5 into a header 154, followed by the LBA user data 140. An alternative embodiment provides a header 156 that includes the LBA seeded IOEDC value 146 and the two-bit sequence count 148 from FIG. 5, followed by the LBA user data 140. Other sector formats can be used. It will be appreciated that FIG. 6 is not represented to scale, so that the amount of header data will be significantly smaller than the amount of user data in a given sector 152.

An entire page's worth of sectors may be processed and written concurrently to the target page 128. Each sector will have its own assigned sequence number depending on which version of that LBA is being written at that time. Reference can be made to the metadata or to a separate LBA sequence number allocation table (not shown) to identify the next available sequence number to be assigned to each LBA version.

Error correction codes (ECC1) 158 are appended to the page to enable detection and correction of up to a selected number of errors in the page data. The ECC1 codes can take any number of forms such as Reed Solomon, BCH, low density parity codes (LDPCs), multi-dimensional parity codes, checksums, cyclical redundancy codes (CRCs), or some other suitable coding values. A new metadata entry (see FIG. 4) is formed for each of the sectors 152 written to the page 128 to complete the write process.

Figure 7:
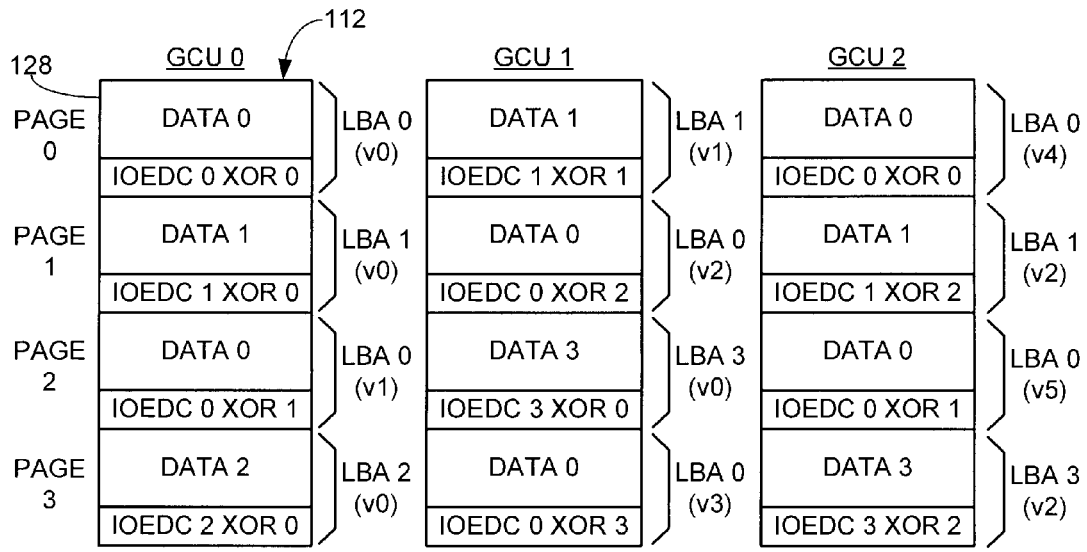
FIG. 7 illustrates three different GCUs formatted in accordance with some embodiments.

A simplified example of how the LBA sequence numbers can be implemented is provided by FIG. 7. In FIG. 7, it is contemplated that a system has just three GCUs 112 identified as GCUs 0, 1 and 2. Each GCU has a total of just 4 pages 128, and each page stores a single sector's worth of data. User data identified as Data 0, 1, 2 and 3 represent the user data for different versions (revision levels) of four LBAs 0, 1, 2 and 3 that are stored to the various pages. FIG. 6 shows six different versions (v0-v5) of LBA 0 written to the respective GCUs, LBA 1 has three different versions (v0-v2), LBA 2 has just a single version (v0), and LBA 3 has three versions (v0-v3).

During system operation, the GCUs are allocated sequentially and data are written to each next available page, so the write sequence is Page 0 of GCU 0 (GCU 0/Page 0), GCU 0/Page 1, GCU 0/Page 2, GCU 0/Page 3, GCU 1/Page 0, and so on to GCU 2/Page 3. It this scheme, data appearing in higher GCU numbers are necessarily newer than data appearing in lower GCU numbers, and within a given GCU, data appearing in higher page numbers are necessarily newer than data appearing in lower GCU numbers.

When the first version of data for LBA 0 is initially written to GCU 0/Page 0, an IOEDC value (IOEDC 0) is generated in accordance with FIG. 5. The IOEDC 0 value is seeded (e.g., XORed) with the first available LBA sequence number, in this case 00 (0). The next sector to be written is the first version of LBA 1 (v0) to GCU 0/Page 1. A base IOEDC 1 value is generated and seeded with the first available LBA sequence number for LBA 1, which is also 0. The third sector written to the system is the second version (v1) of LBA 0, which is written to GCU 0/Page 2. An IOEDC 0 value is generated and seeded with the LBA sequence number 1.

The process continues as shown in the drawing, with the fifth version (v4) of LBA 0 being written to GCU 2/Page 0. The IOEDC 0 value is seeded with a sequence number of 0, as the two bit sequence number has looped back from a value of 3 (11) to a value of 0 (00) at this point. The sequence number (revision indication value) for GCU 2, Page 0 for v4 thus be the same as the revision indication value in GCU 0, page 0 for v0.

The sixth version (v5) of LBA 0 is written to GCU 2/Page 2, and the IOEDC 0 value is seeded with a sequence number of 1. As before, the stored revision indication value for GCU 2/Page 2 for v5 will match the revision indication value in GCU 0/Page 2 for v1. It will be noted that the revision indication values are stored in each block by being embedded within the different SS-IOEDC values.

Figure 8:
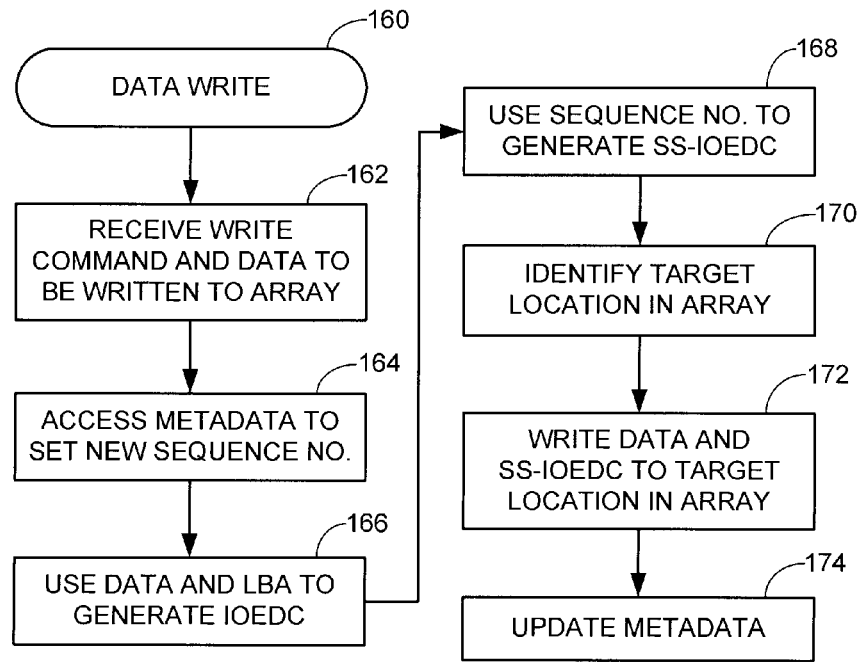
FIG. 8 is a DATA WRITE routine generally illustrative of steps carried out in accordance with various embodiments of the present invention.

FIG. 8 shows a flow chart for a DATA WRITE routine 160 to summarize the foregoing discussion. A write command and associated data are received at step 162 from the host device 102 for storage to the array 106. At step 164, metadata associated with the logical address of the input data are accessed, such as from a metadata table 130 in FIG. 3, to identify the next available sequence number to be used with the input data. The data and the LBA value are combined to generate a base IOEDC value at step 166, and the IOEDC value is seeded with the next available sequence number to generate an SS-IOEDC checksum at step 168.

A target location for storage of the data in the array is identified in step 170. This can be carried out by accessing the GCU sequence data of FIG. 2 to identify the next available GCU and the next available page therein. The data and the SS-IOEDC are written to the target location at step 172, and the metadata entries for the written data, including the most recently used sequence number, are updated at step 174.

Figure 9:
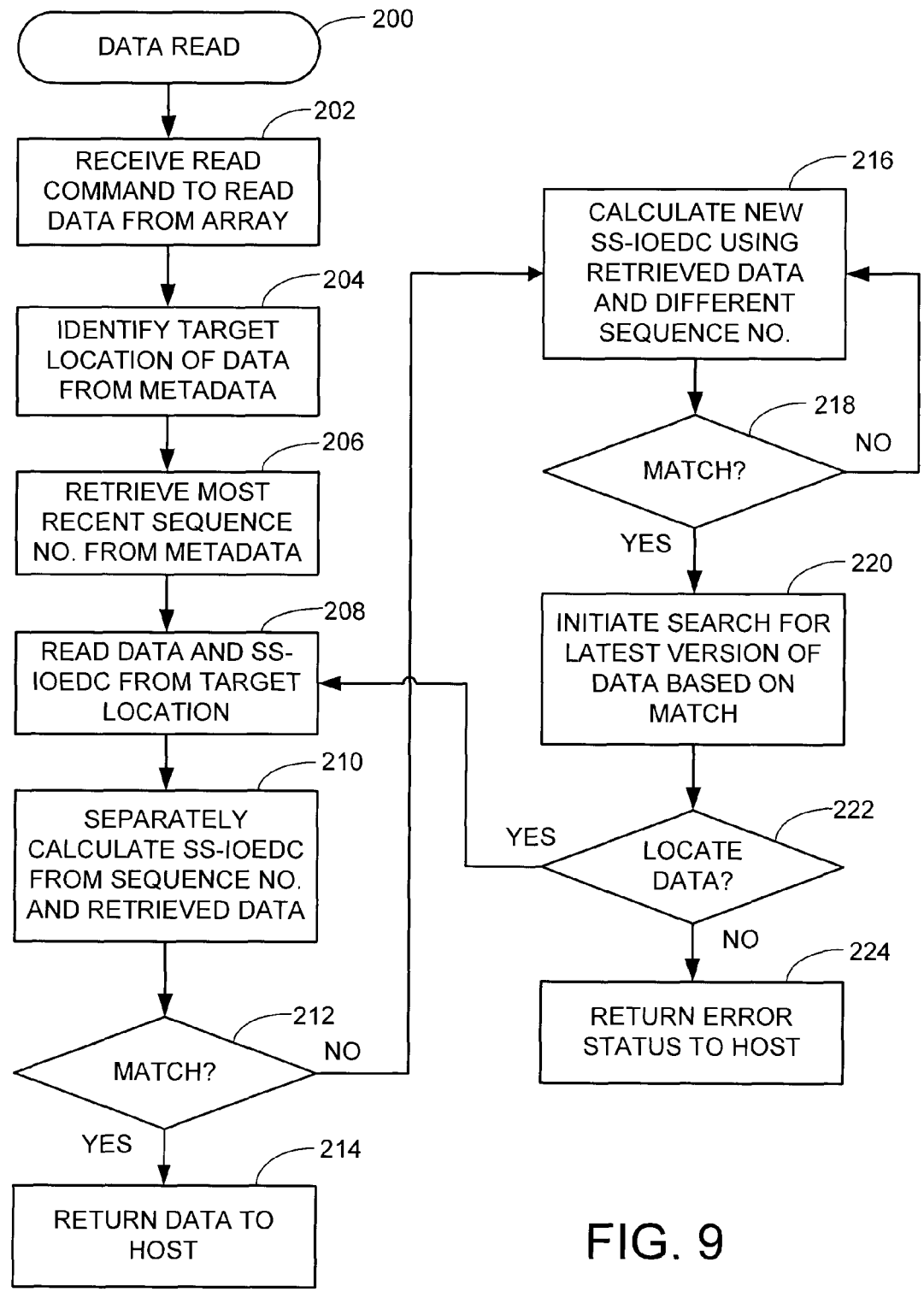
FIG. 9 shows a flowchart for a DATA READ routine generally illustrative of steps carried out in accordance with various embodiments of the present invention.

The written data are subsequently read using a DATA READ routine 200 of FIG. 9. The routine commences with receipt of a read command from the host device 102 to retrieve selected data from the memory array 106. The read command will include a logical address for the data requested by the host. The controller 104 will process the read command by consulting the metadata to identify a target location within the array 106 at which the most recent version of the requested LBA is stored, step 204. The most recently used sequence number for the LBA is also retrieved from the metadata at step 206.

The controller 104 proceeds to direct a read command upon the target location to return the data and SS-IOEDC to local cache at step 208. This may include the reading of the entire page of data along which the requested sector is stored and the application of page level (ECC1) error code processing to correct any errors in the output sequence of bits obtained from the array. The recovered SS-IOEDC is characterized as a first checksum value.

The controller 102 next separately calculates a second SS-IOEDC checksum at step 210 using the LBA value requested by the host at step 202, the sequence number obtained during step 206, and the recovered user data from step 208. The second SS-IOEDC checksum value may be generated as shown in FIG. 5.

The first and second checksum values are compared at 212 and, if there is a match, the correct version of data is confirmed to have been retrieved. The retrieved data are accordingly forwarded to the host device 102 at step 214 and the read process ends.

When a mismatch occurs at decision step 212, the controller 104 enters an error recovery mode. The process flows to step 216 where a new, third checksum value is calculated using a different sequence number. For example, if the second SS-IOEDC value calculated in step 210 used a sequence number of 2, the controller may decrement this count by one and calculate the third SS-IOEDC checksum value using a sequence number count of 1.

If the third checksum matches the first checksum, as shown by step 218 the system will conclude that the returned data from step 208 constitutes the immediately prior version of data stored to the array, and the most current data exists elsewhere in the array. The controller 104 thus initiates a search for the most current version of the data at step 220. The target location identified at step 204 can constitute a boundary point for the search on the basis that the most current version of the requested LBA is in a location that was allocated after the target location was allocated. This may significantly reduce the extent of the searching effort, since all portions of the memory array allocated prior to the target location can be ignored during the search.

The search for the most current version can be carried out in a number of ways. In some embodiments, the most recently allocated GCU is identified using the header information in field 118 (FIG. 2), and the metadata for this most recently allocated GCU is scanned to determine whether any version of the target LBA is stored therein. If so, the version of the target LBA written to the lowest page thereof will constitute the most current version. The system may step through each GCU in turn in reverse allocation order, relying on the previous GCU and next GCU values and the sequence numbers of fields 120, 122 and 124 to aid in this effort.

When another version of the target LBA is located during this reverse order searching, as indicated by step 222, the process returns to step 208 where a fourth SS-IOEDC checksum value is generated and compared to a fifth SS-IOEDC checksum value read out from the new location in the array. If the checksums match, the system will confirm that the latest version has been identified and the LBA data are output to the host. The metadata may be corrected at this time to identify the most current version for the associated LBA to prevent this error during future readback operations for this LBA.

From time to time, it may turn out that no later version of the requested LBA can be found in the array 104 during the searching operation of step 220. In such case, the controller 104 returns an error status indication to the host at step 224. In some embodiments, the notification may include an offer to forward the previous version of data located during step 208 to the host.

It will now be appreciated that the various embodiments presented herein can provide a number of benefits to system operation. The use of a relatively small, repeating seed value for the revision indication function eliminates the need to assign and track a unique revision level for each LBA. Because the system relies on temporal and spatial locality distances between the various versions, the system can easily tolerate different versions of the same data having the same revision indication, unlike other systems that rely upon the assignment of unique identifiers to be able to track revision levels.

The use of a small, cyclical and repeating seed value as embodied herein reduces operational complexity and data storage requirements. Even saving a few bits per sector can add up to a significant reduction in overall data storage resources that need to be used to provide this information. The exemplary seed value further promotes higher fault tolerance for errors in the sequence number and/or metadata. For example, should an error arise in the assignment or tracking of a particular sequence number, the system can still operate to locate and return the most current version of a given sector of data to the host.

While various embodiments disclosed herein have been directed to non-volatile data storage in a flash memory, such is not limiting. Other types of memories and storage discs can be used, including but not limited to non-volatile disc memories in a hard disc drive and volatile memories such as a DRAM data cache.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a memory and a controller adapted to store different versions of a data block having a selected logical address and associated user data in different locations within the memory, and to assign a revision indication value to each said version with at least two of said stored versions concurrently sharing the same revision indication value.

2. The apparatus of claim 1, in which the controller is further adapted to combine the logical address, the user data and the revision indication value for each said version to form an associated checksum value, and to store the associated checksum value and a copy of the user data for said version at the associated location in the memory.

3. The apparatus of claim 2, in which the controller is further adapted to, responsive to a read request to return the user data for a most current version of the data block, retrieve the user data and the checksum value from the associated location in the memory, use the retrieved user data and a copy of the revision indication value to form a second checksum value, and compare the second checksum value with the retrieved checksum value.

4. The apparatus of claim 1, in which the revision indication value constitutes a repeating sequence count that is logically combined with a detection code to form the checksum value.

5. The apparatus of claim 1 in which the user data in each version is a first total number of bits and the associated checksum value for each version is a second smaller total number of bits.

6. The apparatus of claim 1, in which the revision indication value increments over a first total number of counts, and a second total number of the different versions of the addressable data block resident in the memory is greater than the first total number.

7. The apparatus of claim 1, in which an initial error detection code value is generated for each version of the data block using a combinatorial logic function to combine a logical block address (LBA) value associated with said block and the user data stored for each said version, and the initial error detection code value is seeded with the revision indication value to generate the checksum value as a unique sequence-seeded code value that is stored with the respective version of the block.

8. The apparatus of claim 1, in which the revision indication value is a two-bit cyclically repeating count.

9. The apparatus of claim 1, in which the controller is further adapted to retrieve a most current version of said data block from a selected target location of the memory by using metadata to identify a target location for said most current version, to direct an outputting of data from said target location including the user data and the checksum value, to generate a second checksum value using the output user data from said target location and a revision indication value from the metadata, to return the user data to a host device responsive to the second checksum value matching the output checksum value, and to direct a forward search of the metadata for a later version of the data block responsive to the second checksum value not matching the output checksum value.

10. The apparatus of claim 1, in which the memory is characterized as a non-volatile flash memory array comprising a plurality of erasure blocks.

11. An apparatus comprising:
a memory array of erasable non-volatile memory cells arranged into a plurality of erasure blocks and adapted to store user data in the form of addressable data blocks; and
a controller adapted to direct the storage of successive versions of selected data blocks sharing a common logical address to different physical addresses of the erasure blocks, the controller assigning a revision indication value to each one of the successive versions of the selected data blocks as a cyclical repeating sequence count so that at least two of said selected data blocks share the same revision indication value, the controller generating a checksum value for each said version by applying a combinatorial logic function to combine the common logical address, user data and assigned revision indication value, and the controller directing storage of the checksum value along with the user data at the associated physical address.

12. The apparatus of claim 11, in which the at least two of said selected data blocks sharing the same revision indication value comprise an earlier stored stale version of data and a more recently stored current version of data for said common logical address.

13. The apparatus of claim 11, in which the controller seeds an initial checksum value, generated in relation to the LBA value and the associated user data, with the revision indication value to generate a final that is stored in the array with each said successive version.

14. The apparatus of claim 11, in which the controller is further adapted to, responsive to a read request to retrieve a most current version of the data block having the common logical address, to direct recovery of a copy of the user data and the checksum value from the associated physical address, to generate a second checksum value using the recovered copy of the user data, and to compare the second checksum value with the recovered checksum value to verify the recovered copy of the user data is the most current version.

15. A method comprising:
    storing data in the form of addressable blocks to a memory so that successive versions of the blocks sharing a common logical block address (LBA) value and having different user data payloads are stored to different physical addresses of the memory;
    assigning a revision indication value in the form of a cyclical repeating sequence count to each said successive version so that at least two of said versions concurrently share the same revision indication value;
    generating a checksum value for each said version by combining the LBA, the user data payload and the assigned revision indication value; and
    transferring the generated checksum value for storage along with the user data payload at the associated physical addres in the memory.

16. The method of claim 15, in which the generating a checksum value comprises seeding an initial checksum value generated in relation to the LBA value and the user data payload with the revision indication value to generate a final control value that is stored in the memory with each said successive version.

17. The method of claim 15, in which the repeating cyclical sequence count of the assigning step is incremented over a first total number of counts from a minimum value to a maximum value and then returns to the minimum value, and a second total number of said successive versions resident in the memory exceeds the first total number.

18. The method of claim 15, further comprising generating an error correction code (ECC) responsive to the user data and the checksum value to facilitate detection and correction of up to a selected number of errors in said user data and checksum value, and storing the ECC to the associated physical address in the memory.

19. The method of claim 15, further comprising steps of:
    receiving a read command to retrieve a most current version of said data blocks sharing said common LBA value;
    retrieving data from a target location identified by metadata as storing said most current version, the retrieved data including the user data payload and the checksum value;
    using the recovered user data payload to generate a second checksum value; and
    comparing the recovered checksum value and the second checksum value to determine whether the target location stores said most current version.

20. The method of claim 19, further comprising initiating a search for the most current version of said data in locations of the array allocated after allocation of the target location responsive to a mismatch between the recovered and second checksum values.

* * * * *